United States Patent
Gensler, Jr. et al.

(10) Patent No.: US 7,107,446 B2
(45) Date of Patent: Sep. 12, 2006

(54) MECHANISM INDEPENDENT CLUSTER SECURITY SERVICES

(75) Inventors: Robert R. Gensler, Jr., Hyde Park, NY (US); Serban C. Maerean, Carmel, NY (US); Clarence B. Parker, Jr., Kingston, NY (US); Hemant R. Suri, Poughkeepsie, NY (US)

(73) Assignee: International Business Machines Corporation, Armonk, NY (US)

(*) Notice: Subject to any disclaimer, the term of this patent is extended or adjusted under 35 U.S.C. 154(b) by 638 days.

(21) Appl. No.: 09/942,417

(22) Filed: Aug. 30, 2001

(65) Prior Publication Data

US 2003/0046574 A1 Mar. 6, 2003

(51) Int. Cl.
*H04L 9/00* (2006.01)
*G06F 15/16* (2006.01)

(52) U.S. Cl. ............... 713/152; 709/225; 709/229
(58) Field of Classification Search ........... 713/201, 713/200, 156; 380/279; 709/225, 229
See application file for complete search history.

(56) References Cited

U.S. PATENT DOCUMENTS

| | | | | |
|---|---|---|---|---|
| 4,919,545 A | | 4/1990 | Yu | 380/25 |
| 5,235,642 A | * | 8/1993 | Wobber et al. | 713/156 |
| 5,506,961 A | * | 4/1996 | Carlson et al. | 713/200 |
| 5,586,260 A | * | 12/1996 | Hu | 713/201 |
| 5,689,566 A | | 11/1997 | Nguyen | 380/25 |
| 5,870,672 A | | 2/1999 | Stoddard et al. | 455/410 |
| 5,923,756 A | * | 7/1999 | Shambroom | 713/156 |
| 5,991,797 A | | 11/1999 | Futral et al. | 709/216 |
| 6,061,684 A | | 5/2000 | Glasser et al. | 707/9 |
| 6,173,332 B1 | | 1/2001 | Hickman | 709/235 |
| 6,192,483 B1 | | 2/2001 | Moiin et al. | 714/4 |
| 6,198,824 B1 | * | 3/2001 | Shambroom | 380/279 |
| 6,202,157 B1 | | 3/2001 | Brownlie et al. | 713/201 |
| 6,205,551 B1 | | 3/2001 | Grosse | 713/201 |
| 2002/0129274 A1 | * | 9/2002 | Baskey et al. | 713/201 |
| 2003/0046391 A1 | * | 3/2003 | Moreh et al. | 709/225 |

FOREIGN PATENT DOCUMENTS

FR  EP001051009 A1 * 4/2000

* cited by examiner

*Primary Examiner*—Ayaz Sheikh
*Assistant Examiner*—Arezoo Sherkat
(74) *Attorney, Agent, or Firm*—Geraldine D. Monteleone, Esq.; Blanche E. Schiller, Esq.; Heslin Rothenberg Farley & Mesiti P.C.

(57) ABSTRACT

The problem of providing and interacting with a number of different security mechanisms in a clustered data processing environment is solved by providing a Mechanism Abstract Layer which presents a consistent interface to applications running on the various nodes within the cluster. Mechanism Pluggable Modules are provided for each security mechanism that one wishes to employ. The Pluggable Modules provide a mechanism for mapping individualized security mechanism parameters through an interface with the Mechanism Abstract Layer. This provides a consistent interface for applications running on the nodes and it also avoids costly adaptations that would otherwise be necessary to accommodate new security mechanisms or variations in prior security mechanisms.

20 Claims, 1 Drawing Sheet

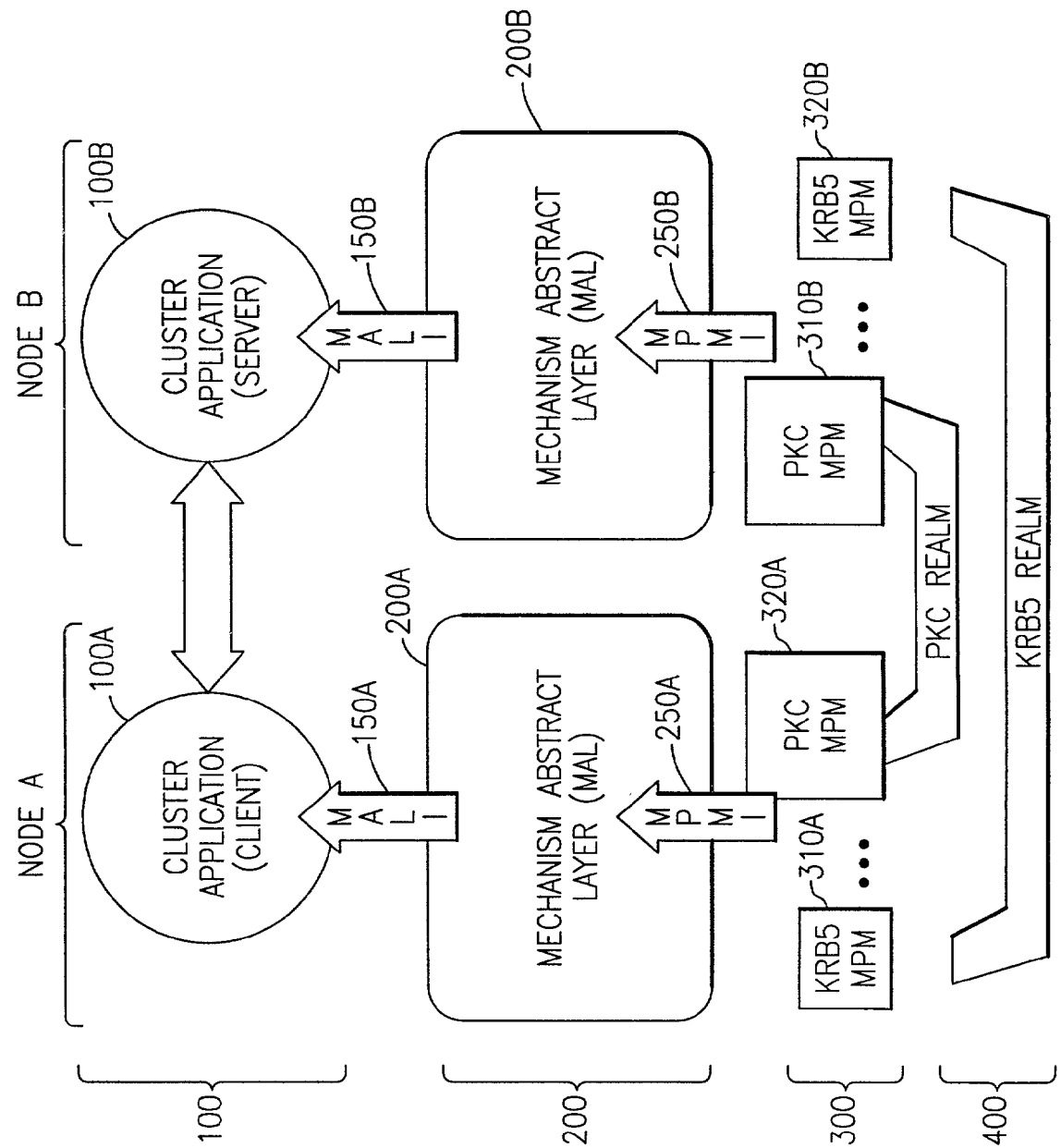

MECHANISM INDEPENDENT CLUSTER SECURITY SERVICES

BACKGROUND OF THE INVENTION

The present invention is generally directed to providing a consistent interface to security services in a data processing environment which includes a plurality of independent nodes configured into one or more node sets referred to as clusters. More particularly, the present invention provides a multilayer interface which permits the modular inclusion of any number of old or new security protocols.

The IBM pSeries of data processing products include the capability of collecting independent data processing nodes together in an arrangement called a cluster for the purpose of providing application level programs with the ability of employing greater hardware resources in to carry out of their individual processing goals. The use of clusters is facilitated through the use of various operating system level utility programs accessed via defined Application Programming Interfaces (API's). Cluster Services are operating system level services that are related to the operation and administration of clusters. Since the data processing systems of the kind considered herein are typically used simultaneously by a large plurality of disparate users with each user requiring a secure computing environment in which to run, there is a corresponding need to imbue Cluster Services with inherent security protocols.

However, there are many different security mechanisms that can be used and each one of them provides a different API and a different implementation of the Global Services System API (GSS API). Application programmers who write code designed to interact directly with the security interfaces provided by the various security mechanisms and protocols must be aware of the differences in interface and implementation.

This situation has resulted in several problems. For example, customers may have different preferences in terms of the particular security mechanism that they want to use. If a customer wants to use a new security mechanism not originally provided for, cost becomes an issue since this often means that many other services need to be modified in order to support the new mechanism.

The Cluster Security Services (CtSec) subsystem of the present invention is designed to solve these problems while providing a secure computing environment for the operation of Cluster Services programming. As implemented herein Cluster Security Services exports a mechanism-independent interface for initial acquisition of such items as network identity, client-server authentication, and client authorization. Its use solves two significant problems. First, customers are no longer locked into the use of a particular security mechanism but now may configure their applications to use the underlying security mechanism of their own choice. Secondly, support associated with providing a new security mechanism impacts only one subsystem, that is, Cluster Security Services rather than impacting all of the subsystems in the cluster.

The advantages of using CtSec are several. First, the application program does not need to be aware of how the underlying security mechanism works. Second, there is thus provided an easy-to-use interface that is not changed whenever support for a new underlying security mechanism is desired. Thirdly, this scheme minimizes the number of changes required for supporting new underlying security mechanisms. Additions or modifications are required only in CtSec and not in the applications using it.

SUMMARY OF THE INVENTION

A preferred embodiment of the present invention provides security services in a clustered data processing environment by first providing a Mechanism Abstraction Layer (MAL) program on at least two nodes of the clustered environment. It is this layer which presents a consistent security interface to applications which run on the nodes. In the present invention, there is also provided at least one security program module, such as KRB5 or PKI, which implements a security service within the cluster. Lastly, there is provided at least one adapter module (Mechanism Pluggable Module (MPM)) for each security program module. The MPM maps parameters of the desired security service to the security interface which is thus now rendered in a consistent manner.

Accordingly, it is an object of the present invention to increase flexibility in providing security services in a clustered environment of data processing nodes.

It is also an object of the present invention to reduce the cost associated with adding a different security mechanism to a clustered data processing environment.

It is a still further object of the present invention to provide a consistent application interface to security mechanisms in a clustered data processing environment.

It is yet another object of the present invention to enhance the utility and functionality of clustered data processing systems.

Lastly, but not limited hereto, it is also an object of the present invention to permit application level programs and programmers a greater range in the selection of security mechanisms in clustered systems.

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

DESCRIPTION OF THE DRAWING

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

FIG. 1 is a schematic diagram illustrating the relations and interactions between and among the multiple layers of components provided in the present invention.

DETAILED DESCRIPTION OF THE INVENTION

The Cluster Security Services (CtSec) subsystem, as described herein, provides a secure computing environment within a cluster of data processing nodes. It is structured in multiple layers so that the specifics details of the design of the security mechanism are transparent the to the clients. FIG. 1 provides a graphical representation of a desired CtSec structure.

CtSec contains the following three layers: (1) a Mechanism Abstraction Layer 200 (MAL; 200A for Node A and 200B for Node B) which provides security services to clients (100A on Node A and 100B on Node B) who interact directly with MAL Application Programming Interface 150 (MALI, 150A on Node A and 150B on Node B); (2)

Mechanism Pluggable Module layer 300 (MPM; 310A and 320A for Node A; and 310B and 320B for Node B) which maps MALI routines 150 to the underlying security mechanism in layer 300; and (3) the underlying security mechanisms themselves in layer 400. These security mechanisms typically include items such as Kerberos Version 5 and PKI. Kerberos is a network authentication protocol. It is provides strong authentication for client/server applications by using secret-key cryptography. A free implementation of this protocol is available from the Massachusetts Institute of Technology. Kerberos is available in many commercial products as well. PKI (Public Key Infrastructure) is the combination of software, encryption technologies, and services that enables enterprises to protect the security of their communications and business transactions on the Internet. PKIs integrate digital certificates, public-key cryptography, and certificate authorities into a total, enterprise-wide network security architecture. There are several vendors who sell PKI products, including Verising, RSA, IBM, amongst others. All of these layers work cooperatively to provide authentication and authorization services to CtSec clients (100A and 100B).

MAL and Its Interface (MALI)

MALI (layer 150) provides generic authentication and authorization routines and mechanism independent Access Control List (ACL) management services. MALI is designed to mask the complexity of the underlying security mechanism and to also mask differences in the interfaces (API's) and the disparate implementations among different security mechanisms. Most of the MALI routines (except for the ACL manipulation routines) in turn call routines exported by loaded MPM's. Multiple MPMs are loaded at one time and MAL determines which MPM to use based on the cluster security setup and also on the negotiated mechanism. It is the application's responsibility to negotiate the security mechanism to use between the cluster application client and the cluster application server by using dedicated MALI routines. Once a security mechanism is negotiated, the MAL selects the appropriate MPM (if it exists), loads it into memory (if it is not already loaded) and calls the routines exported by the MPM (if they are exported by MPM layer 300). Failure in any of these steps results in failure of the MALI routine.

ACL management service is provided by MAL 200 to allow servers to enforce discretionary access control based on ACLs. ACLs contain one or more entries. In preferred embodiments, each ACL entry is defined by type (for example: user, group, "authenticated by" mechanism, authenticated, unauthenticated), mechanism (not used for entries of type unauthenticated or authenticated), id (identifier used for user and group entries), and permission bit mask. The ACLs are opaque to the cluster application (100A or 100B) and they are treated like data buffers with length and body. In one release of the cluster security services, ACL storage is left to the discretion of the application. In other releases, CtSec provides an ACL storage facility that cluster applications use.

MPM and Its Interface (MPMI)

MAL modules (200A and 200B) are an abstraction of the security mechanism in layer 400, and do not make any distinction between different security mechanisms. MAL 200A and 200B use MPM modules 250A and 250B, respectively, to convert the data supplied by the application into the specific data format expected by the security mechanism. Each MPM module exports a set of routines that create the desired MPMI. These routines are implemented using each security mechanism's API and they are called by the MALI routines. MAL 200 uses the pluggable module mechanism to determine which MPMI routines to run. This plug-in mechanism determines which underlying security mechanism is to be configured for use between the client the server, and loads the corresponding plug-in into the process memory space. Then it determines the address of the routine it needs, calls it and passes the specifically correct arguments.

MAL uses a synchronization mechanism to control access to the plug-in code. The synchronization is implemented with single-write/multiple-read locks and allows for unloading of the plugged-in module whenever the underlying security mechanism runtime supports dynamic unloading.

Data Manipulation

CtSec isolates the client from all of the details pertaining to the underlying security mechanism and it does not export data structures that are specific to the mechanism. CtSec clients deal only with generic buffers and pointers (handles to tokens), and they are not aware of the data structure they represent or point to.

The processing of data is done at two levels: MAL 200 processes only the mechanism independent data, and each MPM in layer 300 processes mechanism-specific data. MALI routines rely on MPMI routines to do the "real" work. For example, MAL is responsible for the following: reading security configuration, loading and initializing MPMs, keeping track of each MPM's state, synchronizing access to global data, manipulating ACLs and enforcing access control based on a text representation of the client's identity. MPMs are responsible for the following: acquiring initial credentials, initiating and accepting security contexts between clients and servers, allowing servers to impersonate clients and translating mechanism-specific client identities into printable strings.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method for providing security services in a clustered data processing environment, said method comprising:
    providing an access program layer on one data processing node running an application client and another data processing node running an application server, said access program layer presenting a consistent security interface to said application client and said application server, said consistent security interface representing a security mechanism common to said application client and said application server, wherein said application client has one set of security mechanisms available thereto and said application server has another set of security mechanisms available thereto, and wherein at least one of the one set of security mechanisms and the another set of security mechanisms comprises a plurality of security mechanisms: and
    providing an adapter module for the common security mechanism, said adapter module mapping one or more parameters of a security service implemented by the common security mechanism to said consistent security interface, whereby applications running on the one data processing node and the another data processing node do not require modification to use different security mechanisms.

2. The method of claim 1 in which there are a plurality of more than two of said data processing nodes.

3. The method of claim 1 in which each set of security mechanisms comprises a plurality of security mechanisms.

4. The method of claim 1 in which there are a plurality of said adapter modules.

5. The method of claim 1 in which said access program layer includes authentication and authorization services through said security interface.

6. The method of claim 1 in which said access program layer includes access control services through said security interface.

7. The method of claim 6 in which said access control services includes entries grouped by at least one characteristic selected from the group consisting of type, mechanism, identity and permission bit mask.

8. The method of claim 1 in which said access program layer loads one or more security program modules identified through said security interface.

9. A computer readable medium having computer executable instructions causing a computer to provide an access program layer on one data processing node running an application client and another data processing node running an application server, said access program layer presenting a consistent security interface to said application client and said application server, said consistent security interface representing a security mechanism common to said application client and said application server, wherein said application client has one set of security mechanisms available thereto and said application server has another set of security mechanisms available thereto, and wherein at least one of the one set of security mechanisms and the another set of security mechanisms comprises a plurality of security mechanisms; and to provide an adapter module for the common security mechanism, said adapter module mapping one or more parameters of a security service implemented by the common security mechanism to said consistent security interface, whereby applications running on the one data processing node and the another data processing node do not require modification to use different security mechanisms.

10. A multinode data processing system whose memory contains programming to provide an access program layer on one data processing node running an application client and another data processing node running an application server, said access program layer presenting a consistent security interface to said application client and said application server, said consistent security interface representing a security mechanism common to said application client and said application server, wherein said application client has one set of security mechanisms available thereto and said application server has another set of security mechanisms available thereto, and wherein at least one of the one set of security mechanisms and the another set of security mechanisms comprises a plurality of security mechanisms; and to provide an adapter module for the common security mechanism, said adapter module mapping one or more parameters of a security service implemented by the common security mechanism to said consistent security interface, whereby applications running on the one data processing node and the another data processing node do not require modification to use different security mechanisms.

11. The method of claim 1, further comprising using the access program layer by the application client and the application server to determine one or more security mechanisms of the one set of security mechanisms and the another set of security mechanisms that are common to the application client and the application server, and to negotiate between themselves which security mechanism of the one or more common security mechanisms is to be used as the common security mechanism.

12. The method of claim 1, further comprising providing at least one adapter module for each security mechanism of the one set of security mechanisms and the another set of security mechanisms.

13. A method for providing security services in a clustered data processing environment, said method comprising:
providing an access program layer on at least two data processing nodes of said clustered environment, said layer presenting a consistent security interface, from at least two of said nodes to at least two types of security program modules which implement a security service on different nodes within said cluster, to applications which run on said nodes and which access a same one of said at least two types of security program modules on different nodes, through said consistent interface; and
providing at least one adapter module for each security program module, wherein said at least one adapter module maps parameters of said security service to said security interface, whereby applications running on different nodes do not require modification to use different security program modules.

14. The method of claim 13 in which there are a plurality of more than two of said data processing nodes.

15. The method of claim 13 in which each set of security mechanisms comprises a plurality of security mechanisms.

16. The method of claim 13 in which there are a plurality of said adapter modules.

17. The method of claim 13 in which said access program layer includes authentication and authorization services through said security interface.

18. The method of claim 13 in which said access program layer includes access control services through said security interface.

19. The method of claim 6 in which said access control services includes entries grouped by at least one characteristic selected from the group consisting of type, mechanism, identity and permission bit mask.

20. The method of claim 1 in which said access program layer loads one or more security program modules identified through said security interface.

* * * * *